United States Patent
Ahn

(10) Patent No.: US 12,468,548 B2
(45) Date of Patent: Nov. 11, 2025

(54) TOUCH SENSING SYSTEM AND METHOD FOR SELECTIVELY OPERATION TOUCH FIRMWARE DRIVER DEPENDENCIES WHILE APPLYING UPDATED FROM BOOT LOADER

(71) Applicant: SILICON WORKS CO., LTD., Daejeon (KR)

(72) Inventor: Su Hyun Ahn, Daejeon (KR)

(73) Assignee: SILICON WORKS CO., LTD., Daejeon (KR)

( * ) Notice: Subject to any disclaimer, the term of this patent is extended or adjusted under 35 U.S.C. 154(b) by 90 days.

(21) Appl. No.: 18/506,453

(22) Filed: Nov. 10, 2023

(65) Prior Publication Data

US 2024/0118762 A1   Apr. 11, 2024

Related U.S. Application Data

(63) Continuation of application No. 17/092,987, filed on Nov. 9, 2020, now abandoned.

(30) Foreign Application Priority Data

Dec. 20, 2019  (KR) .................. 10-2019-0171989

(51) Int. Cl.
  *G06F 9/4401* (2018.01)
  *G06F 3/041* (2006.01)
  *G06F 8/65* (2018.01)

(52) U.S. Cl.
  CPC .......... *G06F 9/4411* (2013.01); *G06F 3/0416* (2013.01); *G06F 8/65* (2013.01); *G06F 9/441* (2013.01)

(58) Field of Classification Search
  CPC ...... G06F 9/4411; G06F 3/0416; G06F 9/441; G06F 9/4401; G06F 3/041; G06F 8/65
  See application file for complete search history.

(56) References Cited

U.S. PATENT DOCUMENTS

| | | | |
|---|---|---|---|
| 7,823,148 B2 * | 10/2010 | Deshpande | G06F 8/65 |
| | | | 717/172 |
| 9,189,087 B2 | 11/2015 | Kim | |
| 9,383,989 B1 * | 7/2016 | Qi | G06F 8/65 |
| 9,547,381 B2 | 1/2017 | Choi et al. | |
| 10,152,238 B2 * | 12/2018 | Kim | G06F 3/0607 |
| 10,996,789 B1 | 5/2021 | Lin | |

(Continued)

FOREIGN PATENT DOCUMENTS

| JP | 4871831 B2 | 2/2012 |
|---|---|---|
| KR | 10-2015-0002178 A | 1/2015 |

(Continued)

*Primary Examiner* — Tammara R Peyton
(74) *Attorney, Agent, or Firm* — ROTHWELL, FIGG, ERNST & MANBECK, P.C.

(57) ABSTRACT

The present disclosure relates to a touch system and a method for selectively operating firmware. In particular, it relates to a touch system and a method for selectively operating touch firmware in a touch device by storing a number of pieces of touch firmware supporting a number of host operating systems (OS) respectively in different storing areas of a nonvolatile memory, identifying a host OS installed in the host through communication with the host, and selectively operating the touch firmware supporting the identified host OS.

12 Claims, 8 Drawing Sheets

(56) References Cited

U.S. PATENT DOCUMENTS

| | | | |
|---|---|---|---|
| 12,118,364 B2* | 10/2024 | Lee | G06F 9/4403 |
| 2002/0057771 A1 | 5/2002 | Yoshida | |
| 2009/0150598 A1 | 6/2009 | Jung | |
| 2013/0069894 A1 | 3/2013 | Chen et al. | |
| 2015/0178063 A1* | 6/2015 | Narkinsky | G06F 8/658 |
| | | | 717/168 |
| 2015/0242015 A1 | 8/2015 | Cho | |
| 2017/0090674 A1 | 3/2017 | Meng et al. | |
| 2018/0052600 A1 | 2/2018 | Kim | |
| 2019/0250897 A1* | 8/2019 | Gore | G06F 8/62 |
| 2020/0210203 A1* | 7/2020 | Madala | G06F 8/65 |
| 2021/0004223 A1 | 1/2021 | Von Borany | |
| 2021/0072843 A1 | 3/2021 | Komatsu | |

FOREIGN PATENT DOCUMENTS

| | | |
|---|---|---|
| KR | 10-2015-0116291 A | 10/2015 |
| KR | 10-2018-0020498 A | 2/2018 |
| TW | 201314530 A | 4/2013 |
| TW | 201407427 A | 2/2014 |
| TW | 201712504 A | 4/2017 |
| WO | 2017/094971 A1 | 6/2017 |

* cited by examiner

*FIG. 5A*
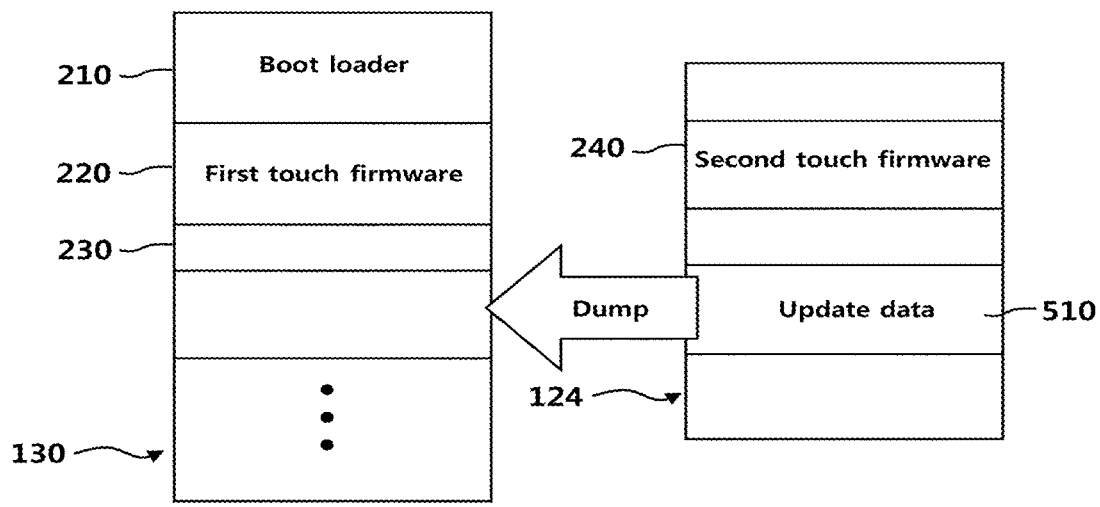
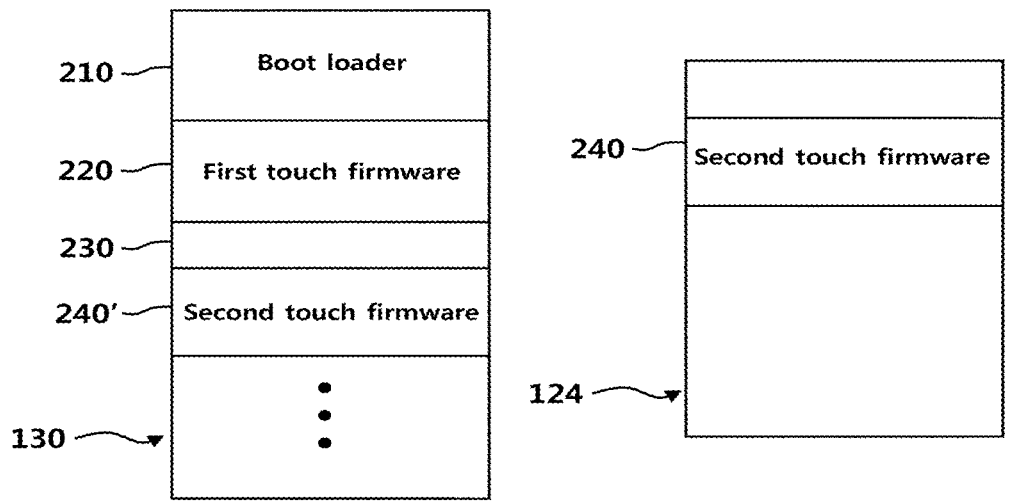
*FIG. 5B*

*FIG. 6A*
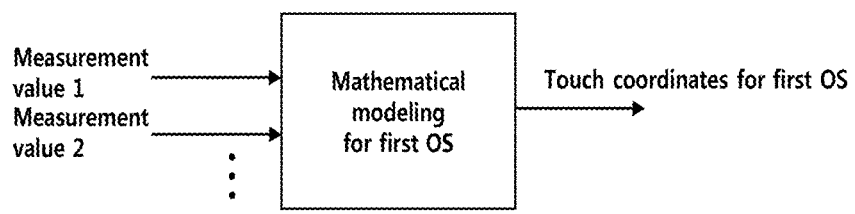
*FIG. 6B*
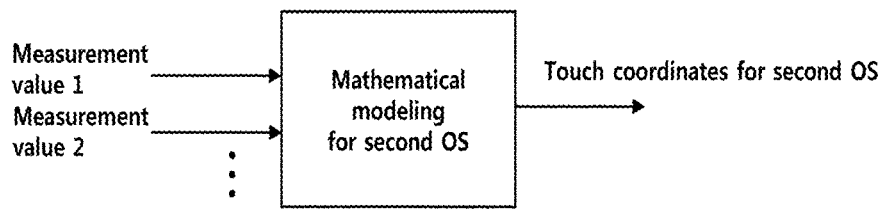
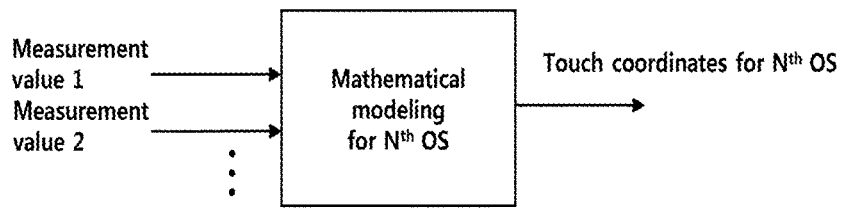
*FIG. 6C*

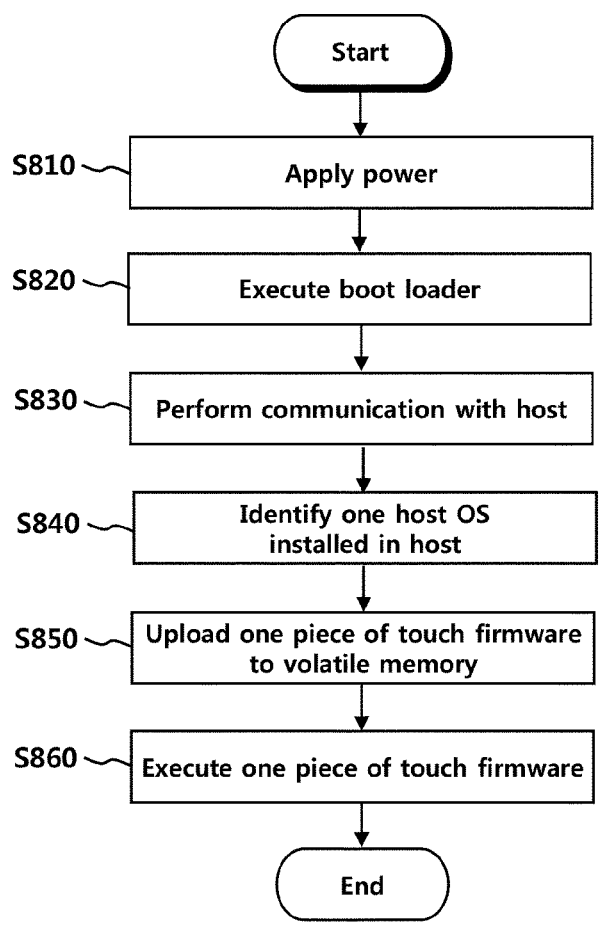

TOUCH SENSING SYSTEM AND METHOD FOR SELECTIVELY OPERATION TOUCH FIRMWARE DRIVER DEPENDENCIES WHILE APPLYING UPDATED FROM BOOT LOADER

CROSS REFERENCE TO RELATED APPLICATION

This application is a continuation application of U.S. patent application Ser. No. 17/092,987 filed on Nov. 9, 2020, which claims priority from Republic of Korea Patent Application No. 10-2019-0171989, filed on Dec. 20, 2019, which are hereby incorporated by references in their entirety.

BACKGROUND

1. Field of Technology

The embodiment relates to a touch system and a method for selectively operating firmware.

2. Description of the Prior Art

Recently, monitors, electronic blackboards, and the like equipped with a touch display have been released.

The monitors, electronic boards, and the like are connected to a separate host. Here, the host may be a desktop computer, a notebook main body, or the like, and the monitor may be a desktop computer monitor, a notebook monitor, or the like.

The host has an operating system (OS) installed therein.

There are various types of operating systems such as MS Windows®, Linux®, Chrome®, Unix®, or the like, and communication protocols and resolution settings may differ between the operating systems.

Meanwhile, a touch display has touch firmware comprised therein, which is a control program for calculating touch coordinates of an object approaching or touching the touch display and transmitting the touch coordinates to the host.

Here, since the communication protocol for communication with a touch display and the standard of touch coordinates received from the touch display may differ between the operating systems installed in the host, the conventional touch firmware comprised in the touch display is made in the form of general-purpose firmware that is able to support various types of operating systems.

Since this general-purpose firmware supports all of the various operating systems of the host, one piece of general-purpose firmware includes all of different communication protocols and touch coordinate standards for the respective operating systems.

Therefore, if it is necessary to modify the communication protocol, the touch coordinate standard, and the like for any one of various types of operating systems, it is required to produce an update file for the entire general-purpose firmware.

As described above, since the general-purpose firmware includes all of the communication protocols and the touch coordinate standards for various types of operating systems, a firmware manufacturer may correct communication protocols and touch coordinate standards of the operating system by mistake, which do not require modification, when producing an update file for the entire general-purpose firmware.

In other words, it is difficult to manage the general-purpose firmware because the general-purpose firmware includes all of the communication protocols, the touch coordinate standards, and the like for various types of operating systems.

SUMMARY

In one aspect, an objective of the embodiment is to provide a technique for efficiently managing and operating a plurality of pieces of touch firmware independently produced for various types of operating systems (OSs) of a host.

To this end, in an aspect, the present disclosure provides a touch system comprising: a touch driving unit configured to supply a driving signal to a sensor electrode of a touch panel comprised in a display device, to receive a response signal to the driving signal from the sensor electrode, and to generate touch data; a processor; a nonvolatile memory configured to store first touch firmware to $N^{th}$ touch firmware (N is a natural number of 2 or more) respectively supporting a first host operating system (OS) to an $N^{th}$ host OS and to store a boot loader for executing a touch firmware; a volatile memory to which the boot loader is uploaded and to which one piece of touch firmware, among the first touch firmware to the $N^{th}$ touch firmware respectively stored in different storage areas of the nonvolatile memory, is uploaded by the boot loader; and a communication interface configured to provide a communication path between the processor and a host, wherein the boot loader is uploaded to the volatile memory by the processor to then be executed, identifies one host OS installed in a host using a host-OS identification signal received through an external input/output terminal or using the communication interface, and then, uploads one piece of touch firmware supporting the one host OS to the volatile memory.

The one piece of touch firmware may calculate touch coordinates in the touch panel according to a coordinate standard applied to the one host OS using the touch data after being executed by the processor in a state of being uploaded to the volatile memory, and transmit the touch coordinates to the host through the communication interface according to a communication protocol applied to the one host OS.

Each of the first touch firmware to the $N^{th}$ touch firmware may comprise mathematical modeling for calculating touch coordinates.

Equations of the mathematical modeling respectively included in the first touch firmware to the $N^{th}$ touch firmware may be different from each other depending on the type of host OS.

The first touch firmware to the $N^{th}$ touch firmware may respectively comprise palm touch identification algorithms for distinguishing between a pen touch and a palm touch.

Configurations of the palm touch identification algorithms respectively included in the first touch firmware to the $N^{th}$ touch firmware may be different from each other depending on the type of host OS.

The boot loader may generate an OS identification signal, to sequentially apply a first host-OS communication protocol to an $N^{th}$ host-OS communication protocol to the OS identification signal, to transmit the OS identification signal to the host through the communication interface, and, in a case when a response signal to the OS identification signal is received from the host when applying one host-OS communication protocol thereto, to determine that the one host OS is installed in the host.

The boot loader may receive a host-OS identification signal transmitted from the host through the external input/output terminal, and, in a case when the host-OS identification signal is an identification signal for the one host OS, to determine that the one host OS is installed in the host.

The external input/output terminal may be a general-purpose input/output (GPIO) terminal.

In another aspect, the present disclosure provides a method for selectively operating touch firmware by a touch device that receives touch data from a touch driving unit configured to supply a driving signal to a sensor electrode of a touch panel comprised in a display device, to receive a response signal to the driving signal from the sensor electrode, and to generate touch data, and calculates touch coordinates in the touch panel using the touch data, the method comprising: a boot loader execution step of executing a boot loader stored in a nonvolatile memory of the display device when power is applied to the display device; a communication step of performing communication with a host connected to the display device through the boot loader; an OS identification step of identifying an operating system (OS) installed in the host through communication with the host; and a firmware execution step of executing one piece of touch firmware supporting one host OS installed in the host, among first touch firmware to $N^{th}$ touch firmware stored in different storage areas of the nonvolatile memory, receiving the touch data from the touch driving unit, and calculating the touch coordinates using the touch data.

The OS identification step comprises: generating an OS identification signal; repeatedly transmitting the OS identification signal to the host by sequentially applying a first host-OS communication protocol to an $N^{th}$ host-OS communication protocol to the OS identification signal; and, in a case when a response signal to the OS identification signal is received from the host when applying one host-OS communication protocol thereto, determining that the one host OS is installed in the host.

The OS identification step comprises: receiving a host-OS identification signal transmitted from the host; and, if the host-OS identification signal is an identification signal for the one host OS, determining that the one host OS is installed in the host.

In the firmware execution step, the touch coordinates are calculated according to a coordinate standard for the one host OS included in the one piece of touch firmware.

The method may further comprise, after the firmware execution step, transmitting the touch coordinates to the host according to one host-OS communication protocol included in the one piece of touch firmware.

In still another aspect, the present disclosure provides a method for selectively operating touch firmware by a touch device that receives touch data from a touch driving unit, configured to supply a driving signal to a sensor electrode of a touch panel comprised in a display device, to receive a response signal to the driving signal from the sensor electrode, and to generate touch data, and calculates touch coordinates in the touch panel using the touch data, the method comprising: a boot loader execution step of executing a boot loader stored in a nonvolatile memory of the display device when power is applied to the display device; an OS identification step of identifying that one host operating system (OS) is installed in a host through a host-OS identification signal received through an external input/output terminal; and a firmware execution step of executing one piece of touch firmware supporting the one host OS, among first touch firmware to $N^{th}$ touch firmware stored in different storage areas of the nonvolatile memory, receiving the touch data from the touch driving unit, and calculating the touch coordinates using the touch data.

As described above, according to the embodiment, it is possible to efficiently manage and operate a number of pieces of touch firmware in a touch device by storing touch firmware, which differs between the types of host OSs installed in the host, in a nonvolatile memory, identifying a host OS installed in the host by a boot loader of a touch MCU, which is a touch device, through communication with the host, and selectively operating the touch firmware suitable for the host according thereto.

BRIEF DESCRIPTION OF THE DRAWINGS

The above and other aspects, features and advantages of the present disclosure will be more apparent from the following detailed description taken in conjunction with the accompanying drawings, in which:

FIGS. 5A to 5B are diagrams illustrating a configuration for updating touch firmware according to an embodiment;

FIGS. 6A to 6C are diagram illustrating different mathematical modelings for respective pieces of touch firmware according to an embodiment;

FIG. 8 is a flowchart illustrating a process of selectively uploading firmware in a touch system according to an embodiment.

DETAILED DESCRIPTION

Figure 1:
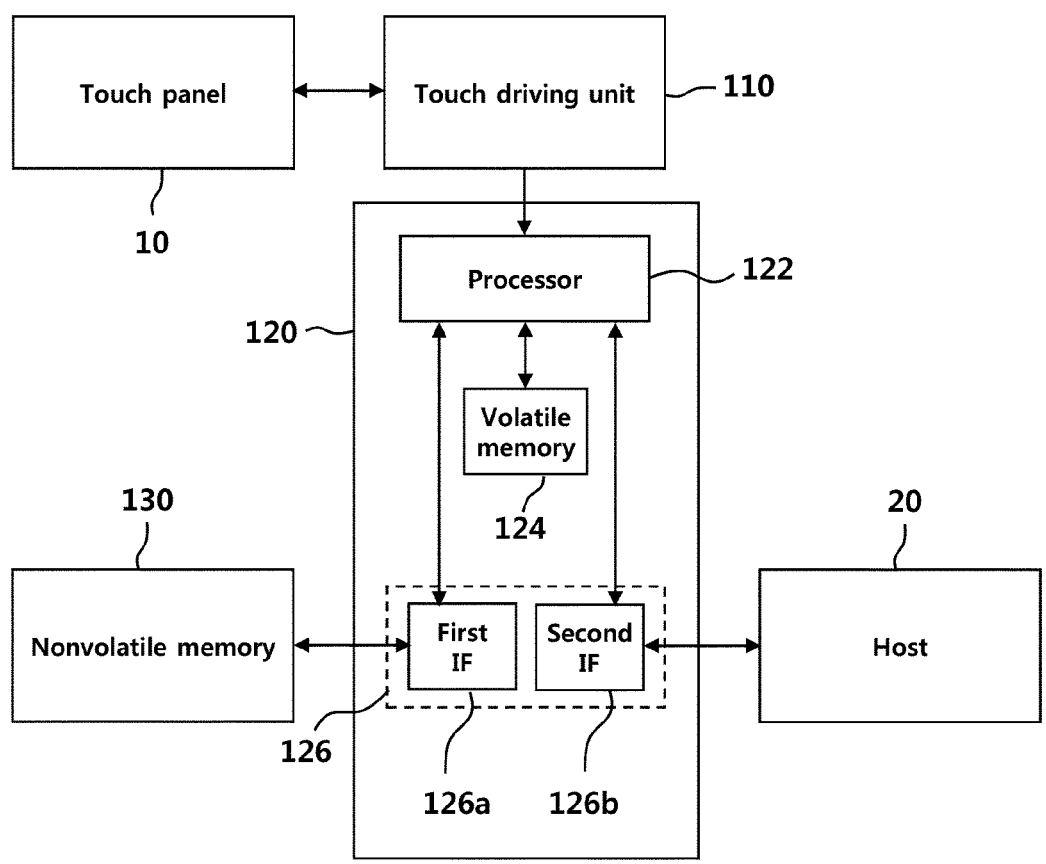
FIG. 1 is a diagram illustrating a configuration of a touch system according to an embodiment.

FIG. 1 is a diagram illustrating the configuration of a touch system according to an embodiment.

Referring to FIG. 1, a touch system 100 according to an embodiment may include a touch driving unit 110, a touch microcontroller unit (MCU) 120, and a nonvolatile memory 130, which interwork with a touch panel 10 of a display device and a host 20. Here, the display device may be a desktop computer monitor, a notebook monitor, an electronic blackboard, and the like, and the host 20 may be a desktop computer, a notebook body, or the like.

Meanwhile, the touch panel 10 may be bonded on an upper polarizing plate constituting a display panel (not shown) of a display device, or may be formed between an upper polarizing plate and an upper substrate. In addition, in the case where the touch panel 10 is formed by an in-cell type, the touch panel 10 may be formed on a lower substrate together with a pixel array in the display panel (not shown).

The touch panel 10 may include sensor electrodes including driving electrodes and reception electrodes.

The touch driving unit 110 supplies driving signals to sensor electrodes of the touch panel 10.

In addition, the touch driving unit 110 may receive response signals from sensor electrodes, and may output touch data according to the response signals.

When an object such as a user's body or a touch pen approaches or touches one point of the touch panel 10, the difference in magnitude between the response signal corresponding to the one point of the touch panel 10 and the response signals of other points thereof may increase. The touch driving unit 110 may generate touch data on the object approaching or touching the one point of the touch panel 10 according thereto.

The touch MCU 120, that is, a touch device, may calculate touch coordinates in the touch panel 10 using the touch data generated by the touch driving unit 110.

In addition, the touch MCU 120 may transmit the touch coordinates to the host 20.

The touch MCU 120 may include a processor 122, a volatile memory 124, and a communication interface 126. In addition, the touch MCU 120 may further include an external input/output terminal (not shown).

Figure 3A:
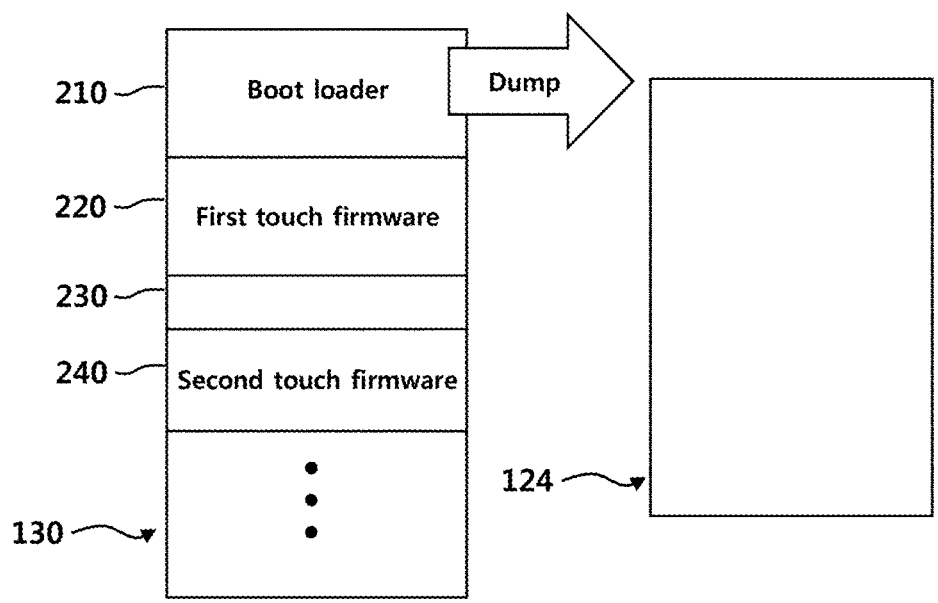
FIGS. 3A to 3B and FIGS. 4A to 4B are diagrams illustrating a configuration in which a boot loader according to an embodiment selectively uploads one piece of touch firmware depending on an operating system (OS) of a host according to an embodiment.
Figure 3B:
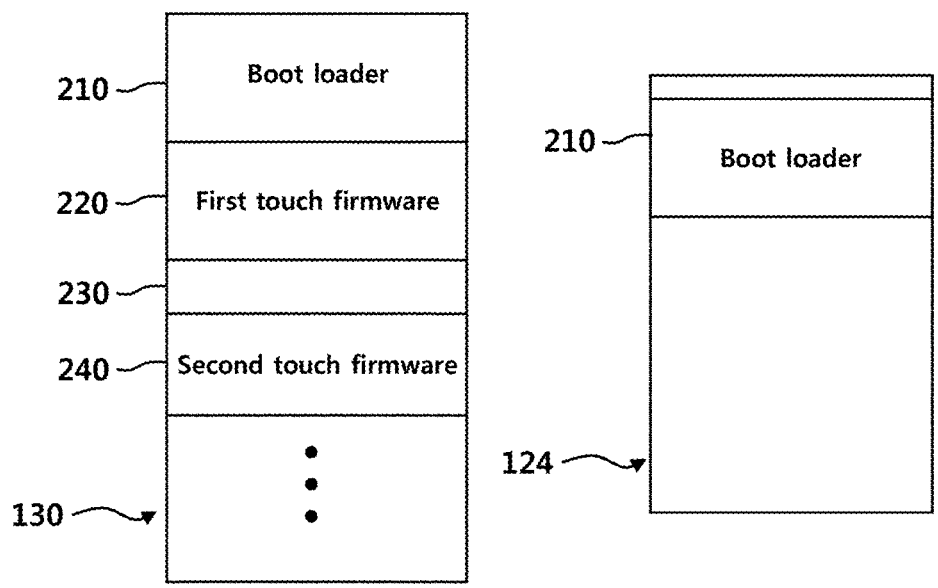

When power is applied to the display device, the processor 122 may upload a boot loader 210 stored in the nonvolatile memory 130 to the volatile memory 124, and may execute the same as shown in FIG. 3B.

The touch MCU 120 may identify the type of operating system (OS) of the host 20 connected to the display device through the execution of the boot loader 210, and may selectively execute one piece of touch firmware supporting one host OS installed in the host 20, among first touch firmware 220 to $N^{th}$ touch firmware stored in the nonvolatile memory 130.

In other words, the boot loader 210 may include an algorithm for identifying the type of OS installed in the host 20 through communication with the host 20 via the communication interface 126 and selectively uploading touch firmware supporting the OS installed in the host 20. Here, the OSs, which are able to be installed in the host 20, may be a first host OS to an $N^{th}$ host OS, and the first touch firmware 220 to the $N^{th}$, touch firmware may support the first host OS to the $N^{th}$ host OS.

Specifically, the boot loader 210 executed by the processor 122 may identify that one host OS is installed in the host 20 using the communication interface 126. Here, the boot loader 210 may generate an OS identification signal, which is a test signal for identifying the type of host OS, and may transmit the OS identification signal to the host 20 through the communication interface 126 while sequentially applying a first host-OS communication protocol to an $N^{th}$ host-OS communication protocol.

In addition, if a response signal to an OS identification signal is received from the host 20 after transmitting the OS identification signal to the host 20 by applying one host-OS communication protocol, the boot loader 210 may determine that one host OS is installed in the host 20.

For example, if the boot loader 210 fails to receive a response signal from the host 20 after transmitting an OS identification signal to the host 20 by applying the first host-OS communication protocol, the boot loader 210 may retransmit the OS identification signal to the host 20 by applying the second host-OS communication protocol. In addition, if a response signal to the OS identification signal is received from the host 20, the boot loader 210 may determine that a second host OS is installed in the host 20. Here, the host-OS communication protocol may be a protocol for communication between the host 20 and peripheral devices. For example, the host-OS communication protocol may be a serial communication protocol.

In addition to the above method, the boot loader 210 may receive a host-OS identification signal transmitted from the host 20 through an external input/output terminal (not shown), and may identify the host-OS identification signal. According thereto, the boot loader 210 may identify that the host-OS identification signal is an identification signal for the one host OS, and may determine that the one host OS is installed in the host 20. Here, the host-OS identification signal may include one or more binary numbers, and the configuration of the binary numbers may differ depending on the type of host OS. For example, a host-OS identification signal for a first host OS may include a binary number "00", a host-OS identification signal for a second host OS may include a binary number "01", and a host-OS identification signal for a third host OS may include a binary number "10".

The boot loader 210 having identified the type of the host OS installed in the host 20 as described above may upload one piece of touch firmware supporting the one host OS, among the first touch firmware 220 to the $N^{th}$ touch firmware stored in different storage areas of the nonvolatile memory 130, to the volatile memory 124.

Figure 4A:
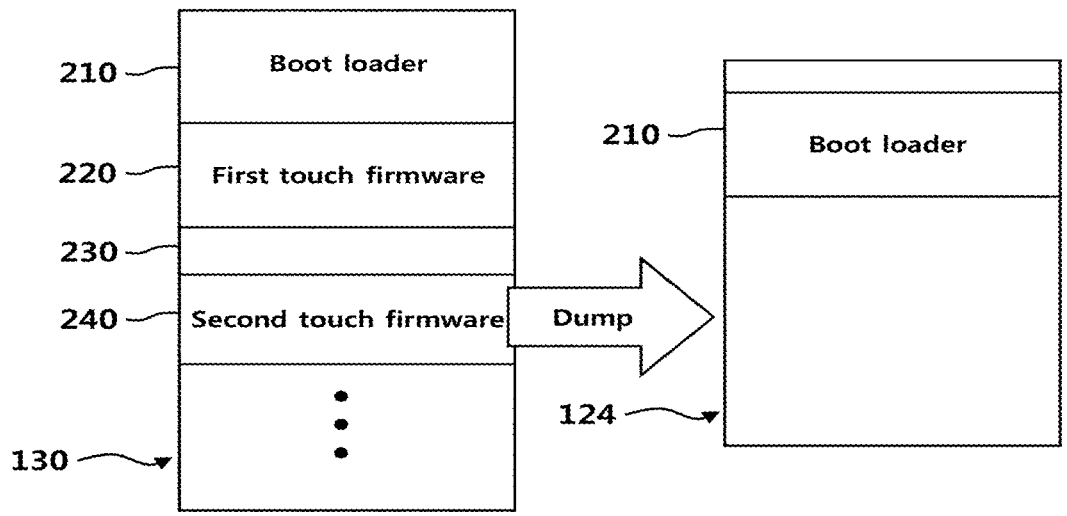
Figure 4B:
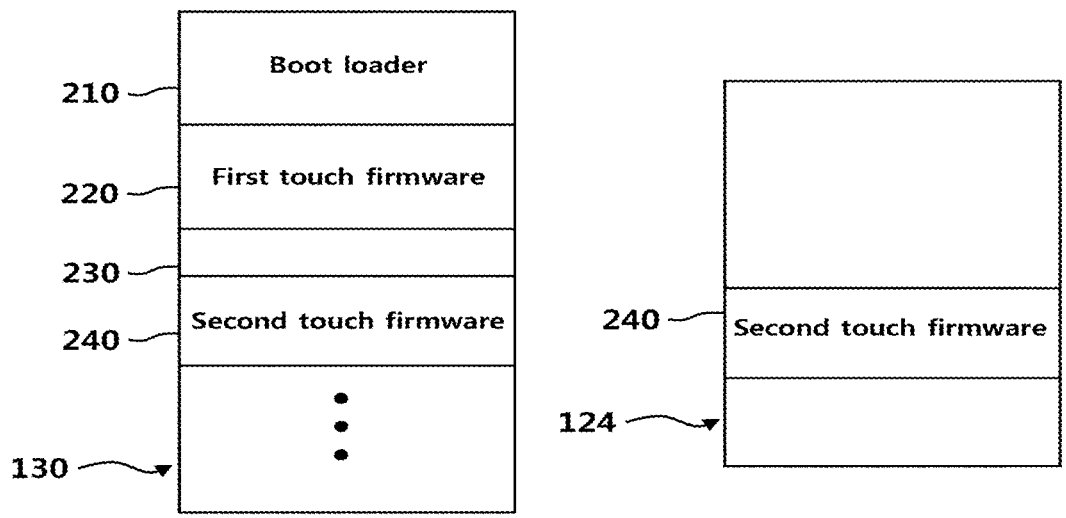
Figure 7:
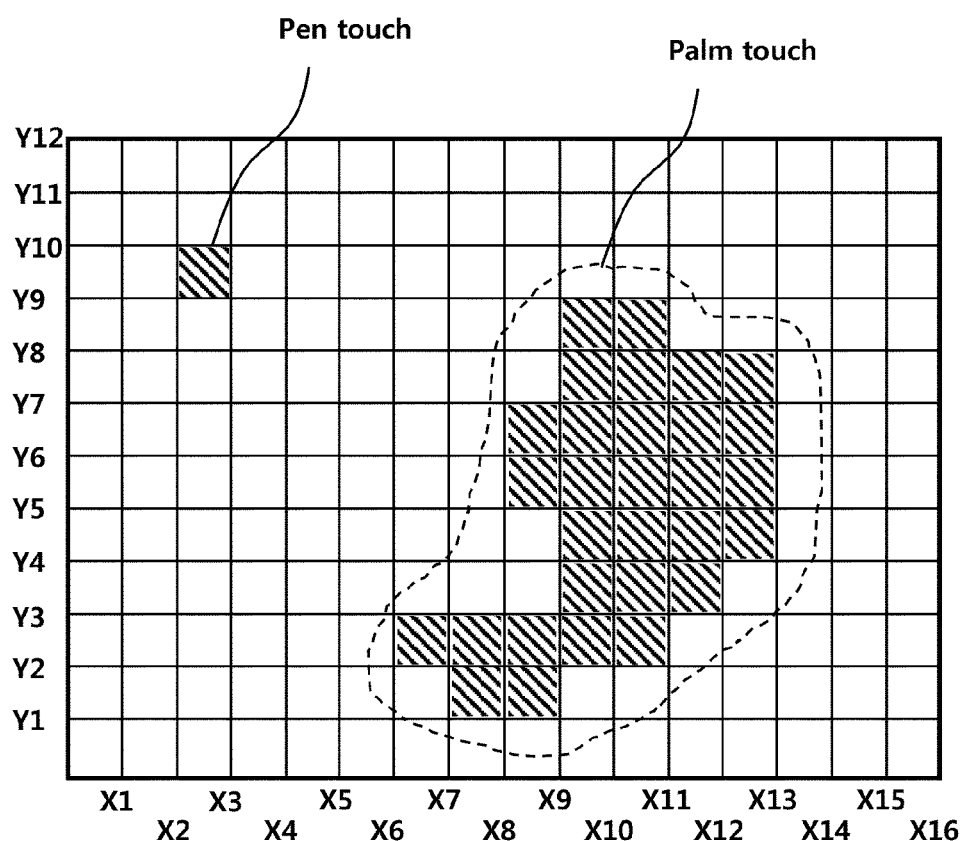
FIG. 7 is a diagram illustrating different palm touch identification algorithms for respective pieces of touch firmware according to an embodiment.

For example, if the one host OS installed in the host 20 is the second host OS, the boot loader 210 may copy a second touch firmware 240 stored in the nonvolatile memory 130 as shown in FIG. 4A, and may then upload the same to the volatile memory 124 as shown in FIG. 4B.

In addition, the boot loader 210 may execute one piece of touch firmware in the volatile memory 124. Thereafter, the boot loader 210 may be deleted from the volatile memory 124 as shown in FIG. 4B.

Meanwhile, one piece of touch firmware executed in the state of being uploaded to the volatile memory 124 by the boot loader 210, that is, one piece of touch firmware executed by the processor 122 executing the boot loader 210 may calculate touch coordinates in the touch panel 10 using touch data transmitted from the touch driving unit 110 to the touch MCU 120 through a third communication interface (not shown). Here, the one piece of touch firmware may calculate touch coordinates according to a coordinate standard for the one host OS.

In addition, the one piece of touch firmware may transmit the touch coordinates to the host 20 through the communication interface 126. Here, the one piece of touch firmware may transmit the touch coordinates to the host 20 according to one host-OS communication protocol.

Meanwhile, in the case where the host 20 transmits update data on the one piece of touch firmware while the one piece of touch firmware is running, the one piece of touch firmware may receive the update data through the communication interface 126, may temporarily store the same in the volatile memory 124, and may delete the one piece of touch firmware stored in the nonvolatile memory 130.

In addition, the update data temporarily stored in the volatile memory 124 may be stored in the nonvolatile memory 130, and may be stored in the storage area in which the one piece of touch firmware has been stored.

For example, in the case where update data is received from the host 20 in the state in which a second touch firmware 240 is uploaded to the volatile memory 124 and is being executed, the second touch firmware 240 may temporarily store the update data 510 in the volatile memory 124 as shown in FIG. 5A, and may delete the second touch firmware stored in the nonvolatile memory 130.

In addition, the second touch firmware 240 may store the update data 510, which is temporarily stored in the volatile memory 124, in the nonvolatile memory 130, and may store the same in the storage area in which the second touch firmware has been stored.

Accordingly, the update data may be stored as second updated touch firmware 240' as shown in FIG. 5B. Here, the second touch firmware 240 may verify the validity of the update data, and only if the validity of the update data is verified, may store the same as the second updated touch firmware 240' as shown in FIG. 5B.

If power is shut off from the display device and is reapplied thereto after the second updated touch firmware 240' is stored in the nonvolatile memory 130, the second updated touch firmware 240' may be uploaded to the volatile memory 124, and may then be executed.

The volatile memory 124 is a storage medium that requires electricity in order to maintain stored information, and is used for temporary storage of data processed by the touch MCU 120. The volatile memory 124 may be a random access memory (RAM) or the like.

In an embodiment, the boot loader 210 stored in the nonvolatile memory 130 may be uploaded to the volatile memory 124.

In addition, one piece of touch firmware supporting one host OS installed in the host 20, among the first touch firmware to the $N^{th}$ touch firmware stored in the nonvolatile memory 130, may be uploaded. Here, the hardware subject for uploading the boot loader 210 and one piece of touch firmware may be the processor 122, and the software subject for uploading the boot loader 210 may be a BIOS (not shown). In addition, the software subject for uploading one piece of touch firmware may be the boot loader 210.

The communication interface 126 may include a first communication interface 126a providing a communication path between the processor 122 and the nonvolatile memory 130, and a second communication interface 126b providing a communication path between the processor 122 and the host 20.

In an embodiment, in the case where the touch device, that is, the touch MCU 120 is implemented as a single integrated circuit chip, the communication interface 126 may be physically implemented in the form of a pin.

Meanwhile, an external input/output terminal (not shown) capable of receiving a host-OS identification signal from the host 20 may be a general-purpose input/output (GPIO) terminal, which is a multipurpose input/output terminal.

The nonvolatile memory 130 is a storage medium that stores information even when power is not supplied, and in which information is freely input and output when power is supplied. The nonvolatile memory 130 may be a flash memory or the like.

Figure 2:
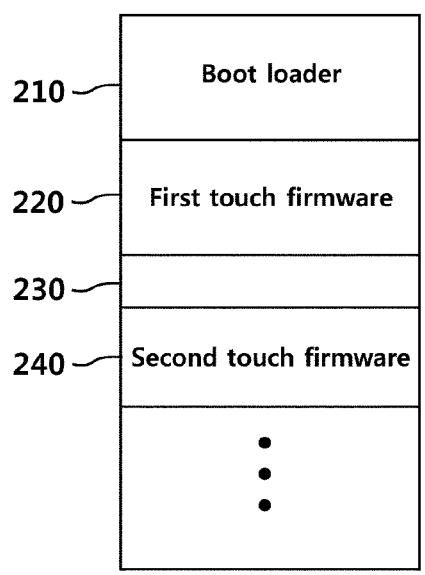
FIG. 2 is a diagram showing storage areas of a nonvolatile memory according to an embodiment as an example.

In an embodiment, as shown in FIG. 2, the nonvolatile memory 130 may store the first touch firmware to the $N^{th}$ touch firmware in different storage areas, and may store the boot loader 210 for execution of the touch firmware. Here, a blank area may be provided between neighboring storage areas of the touch firmware in the nonvolatile memory 130.

For example, in FIG. 2, a blank area 230 may be provided between a storage area in which the first touch firmware 220 is stored and a storage area in which the second touch firmware 240 is stored.

This is due to the fact that if the size of update data increases compared to the size of existing data of the touch firmware when updating the touch firmware, the update data may be stored beyond the storage area of the firmware. Therefore, a blank area 230 corresponding to a predetermined memory section may be allocated between the storage areas of the firmware, which are adjacent to each other, in the nonvolatile memory 130.

Meanwhile, the first touch firmware to the $N^{th}$ touch firmware may support the first host OS to the $N^{th}$ host OS, respectively. In other words, the first touch firmware may support the first host OS, and the $N^{th}$ touch firmware may support the $N^{th}$ host OS.

In an embodiment, the first touch firmware to the $N^{th}$ touch firmware may include different touch coordinate standards and communication protocols depending on the types of host OSs supported thereby.

In other words, the first touch firmware may include a coordinate standard for the first host OS, which is a touch coordinate standard applied to the first host OS, and a first host-OS communication protocol, which is a communication protocol applied to the first host OS, and the $N^{th}$ touch firmware may include a coordinate standard for the $N^{th}$ host OS, which is a touch coordinate standard applied to the $N^{th}$ host OS, and an $N^{th}$ host-OS communication protocol, which is a communication protocol applied to the $N^{th}$, host OS.

In addition, each of the first touch firmware to the $N^{th}$ touch firmware may include mathematical modeling for calculating touch coordinates.

Equations of the mathematical modeling included in the first touch firmware to the $N^{th}$ touch firmware may be different from each other depending on the type of host OS. According thereto, the first touch firmware to the $N^{th}$ touch firmware may calculate touch coordinates conforming to the host OS supported thereby when calculating the touch coordinates.

For example, the first touch firmware may apply a plurality of measurement values included in touch data to mathematical modeling for a first OS, thereby calculating touch coordinates for the first OS as shown in FIG. 6A, and the second touch firmware may apply a plurality of measurement values to mathematical modeling for a second OS, thereby calculating touch coordinates for the second OS as shown in FIG. 6B.

Likewise, the $N^{th}$ touch firmware may apply a plurality of measurement values to mathematical modeling for an $N^{th}$ OS, thereby calculating touch coordinates for the $N^{th}$ OS as shown in FIG. 6C. Here, equations of the mathematical modeling may be configured as a polynomial, and the measurement value may be a measurement value of capacitance or a measurement value of touch pressure at a touch point in the touch panel 10.

In an embodiment, each of the first touch firmware to the $N^{th}$, touch firmware may include a palm touch identification algorithm for distinguishing between a pen touch and a palm touch.

The configuration of the palm touch identification algorithm included in each of the first touch firmware to the $N^{th}$ touch firmware may differ depending on the type of host OS. According thereto, a palm touch may be identified by reflecting the characteristics of the host OSs supported by the first touch firmware to the $N^{th}$ touch firmware.

Here, the palm touch indicates a touch area in which a part of a user's body (for example, the edge of a user's hand) comes into contact with the touch panel 10 when a user who uses the display device touches the touch panel 10 using a touch pen and is sensed on the touch panel 10, as shown in 7.

As described above, in an embodiment, different pieces of touch firmware depending on the type of host OS installed in the host 20 may be stored in the nonvolatile memory 130, and the boot loader of the touch MCU 120, which is a touch device, may identify the host OS installed in the host 20 through communication with the host 20. Accordingly, it is possible to selectively operate the touch firmware suitable for the host 20 by the touch MCU 120, thereby efficiently managing a plurality of pieces of touch firmware.

Hereinafter, a process of selectively uploading the touch firmware in the touch system 100 will be described.

FIG. 8 is a flowchart illustrating a process of selectively uploading firmware in a touch system according to an embodiment.

Referring to FIG. 8, when power is applied to the display device, the boot loader 210 stored in the nonvolatile memory 130 is uploaded to the volatile memory 124 and is executed by the processor 122 of the touch MCU 120 (S810 and S820).

The touch MCU 120 may communicate with the host 20 connected to the display device through the execution of the boot loader 210, thereby identifying one host OS installed in the host 20 (S830 and S840). In step S840, the touch MCU 120 may generate an OS identification signal, and may repeatedly transmit the OS identification signal to the host 20 by sequentially applying a first host-OS communication protocol to an $N^{th}$ host-OS communication protocol thereto. In addition, if a response signal to the OS identification signal, which is transmitted to the host 20 by applying one host-OS communication protocol, is received from the host 20, the touch MCU 120 may determine that one host OS is installed in the host 20.

In addition, in step S840, the touch MCU 120 may receive a host-OS identification signal transmitted from the host 20, and if the host-OS identification signal is an identification signal for one host OS, the touch MCU 120 may determine that the one host OS is installed in the host 20.

The touch MCU 120, having identified that the one host OS is installed in the host 20 as described above, may upload one piece of touch firmware supporting the one host OS, among the first touch firmware to the $N^{th}$ touch firmware stored in the nonvolatile memory 130, to the volatile memory 124 (S850).

Thereafter, the touch MCU 120 may execute the one piece of touch firmware (S860). After step S860, the touch MCU 120 may delete the boot loader 210 from the volatile memory 124.

Meanwhile, by executing one piece of touch firmware, the touch MCU 120 may calculate touch coordinates in the touch panel 10 from touch data transmitted by the touch driving unit 110 through a third communication interface (not shown). Here, the touch MCU 120 may calculate touch coordinates according to a coordinate standard for the one host OS included in the one piece of touch firmware.

In addition, the touch MCU 120 may transmit, to the host 20, touch coordinates according to one host-OS communication protocol included in the one piece of touch firmware.

What is claimed is:

1. A method comprising:
    a boot loader receiving an operating system (OS) identification signal which identifies an OS installed in a host;
    based on the received OS identification signal, the boot loader identifying the OS installed in the host;
    after identifying the OS installed in the host, the boot loader selecting, from at least a first touch firmware including a first touch coordinate standard for a first OS and a second touch firmware including a second touch coordinate standard for a second OS, a touch firmware including a specific touch coordinate standard for the identified OS;
    after selecting the touch firmware including the specific touch coordinate standard for the identified OS, the boot loader uploading the selected touch firmware stored in a nonvolatile memory to a volatile memory;
    a controller executing the selected touch firmware from the volatile memory;
    the controller detecting one or more touches occurred at a touch panel; and
    the controller calculating one or more coordinates of said one or more touches according to the specific touch coordinate standard for the identified OS, wherein the method further comprises:
    the boot loader generating a first test signal associated with the first OS; and
    the boot loader transmitting the first test signal to the host, wherein
    the boot loader receives the OS identification signal in response to transmitting the first test signal only when the OS installed in the host is the first OS, and
    wherein the method further comprises:
    the boot loader determining that the boot loader has failed to receive any response to the first test signal;
    after the determination, the boot loader generating a second test signal associated with the second OS; and
    the boot loader transmitting the second test signal to the host, wherein
    the boot loader receives the OS identification signal in response to transmitting the second test signal only when the OS installed in the host is the second OS.

2. The method of claim 1, wherein each of the first touch coordinate standard and the second touch coordinate standard is associated with a specific mathematical modelling for calculating a touch coordinate.

3. The method of claim 1, wherein
    the first test signal is transmitted using a first communication protocol associated with the first OS, and
    the second test signal is transmitted using a second communication protocol associated with the second OS.

4. The method of claim 1, wherein the method further comprises:
    while the controller is executing the selected touch firmware from the volatile memory, the boot loader receiving, from the host, update data on one or more pieces of the selected touch firmware; and
    based on receiving the update data, storing the update data in the nonvolatile memory and deleting said one or more pieces of the selected touch firmware stored in a first storage area of the nonvolatile memory.

5. A method comprising:
    a boot loader receiving an operating system (OS) identification signal which identifies an OS installed in a host;
    based on the received OS identification signal, the boot loader identifying the OS installed in the host;
    after identifying the OS installed in the host, the boot loader selecting, from at least a first touch firmware including a first touch coordinate standard for a first OS and a second touch firmware including a second touch coordinate standard for a second OS, a touch firmware including a specific touch coordinate standard for the identified OS;
    after selecting the touch firmware including the specific touch coordinate standard for the identified OS, the boot loader uploading the selected touch firmware stored in a nonvolatile memory to a volatile memory;
    a controller executing the selected touch firmware from the volatile memory;
    the controller detecting one or more touches occurred at a touch panel; and
    the controller calculating one or more coordinates of said one or more touches according to the specific touch coordinate standard for the identified OS, wherein the method further comprises:
while the controller is executing the selected touch firmware from the volatile memory, the boot loader receiving, from the host, update data on one or more pieces of the selected touch firmware; and
based on receiving the update data, storing the update data in the nonvolatile memory and deleting said one or more pieces of the selected touch firmware stored in a first storage area of the nonvolatile memory, and
wherein the method further comprises:
after deleting said one or more pieces of the selected touch firmware stored in the first storage area of the nonvolatile memory, storing at least some of the update data in the first storage area of the nonvolatile memory.

6. The method of claim 5, wherein
a blank storage area is provided between the first storage area of the nonvolatile memory and a second storage area of the nonvolatile memory,
the second storage area of the nonvolatile memory is configured to store a touch firmware associated with a particular OS, and
at least some of the update data is stored in the blank storage area.

7. A system comprising:
a host configured to run an operating system (OS);
a touch panel configured to perform a touch detection;
a controller configured to calculate a touch coordinate;
a nonvolatile memory configured to store at least a first touch firmware including a first touch coordinate standard for a first OS and a second touch firmware including a second touch coordinate standard for a second OS;
a volatile memory configured to store a boot loader, wherein
the boot loader is configured to:
  receive an OS identification signal which identifies the OS installed in the host;
  based on the received OS identification signal, identify the OS installed in the host;
  after identifying the OS installed in the host, select, from at least the first touch firmware including the first touch coordinate standard for the first OS and the second touch firmware including the second touch coordinate standard for the second OS, a touch firmware including a specific touch coordinate standard for the identified OS; and
  after selecting the touch firmware including the specific touch coordinate standard for the identified OS, upload the selected touch firmware stored in the nonvolatile memory to the volatile memory, and
the controller is configured to:
  execute the selected touch firmware from the volatile memory;
  detect one or more touches occurred at the touch panel; and
  calculate one or more coordinates of said one or more touches according to the specific touch coordinate standard for the identified OS,
wherein the boot loader is further configured to:
generate a first test signal associated with the first OS;
transmit the first test signal to the host; and
receive the OS identification signal in response to transmitting the first test signal only when the OS installed in the host is the first OS, and
wherein the boot loader is further configured to:
determine that the boot loader has failed to receive any response to the first test signal;
after the determination, generate a second test signal associated with the second OS;
transmit the second test signal to the host; and
receive the OS identification signal in response to transmitting the second test signal only when the OS installed in the host is the second OS.

8. The system of claim 7, wherein each of the first touch coordinate standard and the second touch coordinate standard is associated with a specific mathematical modelling for calculating a touch coordinate.

9. The system of claim 7, wherein
the first test signal is transmitted using a first communication protocol associated with the first OS, and
the second test signal is transmitted using a second communication protocol associated with the second OS.

10. The system of claim 7, wherein the boot loader is further configured to:
while the controller is executing the selected touch firmware from the volatile memory, receive, from the host, update data on one or more pieces of the selected touch firmware; and
based on receiving the update data, store the update data in the nonvolatile memory and delete said one or more pieces of the selected touch firmware stored in a first storage area of the nonvolatile memory.

11. A system comprising:
a host configured to run an operating system (OS);
a touch panel configured to perform a touch detection;
a controller configured to calculate a touch coordinate;
a nonvolatile memory configured to store at least a first touch firmware including a first touch coordinate standard for a first OS and a second touch firmware including a second touch coordinate standard for a second OS;
a volatile memory configured to store a boot loader, wherein
the boot loader is configured to:
receive an OS identification signal which identifies the OS installed in the host;
based on the received OS identification signal, identify the OS installed in the host;
after identifying the OS installed in the host, select, from at least the first touch firmware including the first touch coordinate standard for the first OS and the second touch firmware including the second touch coordinate standard for the second OS, a touch firmware including a specific touch coordinate standard for the identified OS; and
after selecting the touch firmware including the specific touch coordinate standard for the identified OS, upload the selected touch firmware stored in the nonvolatile memory to the volatile memory, and
the controller is configured to:
execute the selected touch firmware from the volatile memory;
detect one or more touches occurred at the touch panel; and
calculate one or more coordinates of said one or more touches according to the specific touch coordinate standard for the identified OS,
wherein the boot loader is further configured to:
while the controller is executing the selected touch firmware from the volatile memory, receive, from the host, update data on one or more pieces of the selected touch firmware; and based on receiving the update data, store the update data in the nonvolatile memory and delete said one or more pieces of the selected touch firmware stored in a first storage area of the nonvolatile memory, and wherein the system is further configured to:

after deleting said one or more pieces of the selected touch firmware stored in the first storage area of the nonvolatile memory, store at least some of the update data in the first storage area of the nonvolatile memory.

12. The system of claim 11, wherein a blank storage area is provided between the first storage area of the nonvolatile memory and a second storage area of the nonvolatile memory, the second storage area of the nonvolatile memory is configured to store a touch firmware associated with a particular OS, and at least some of the update data is stored in the blank storage area.

* * * * *